Aug. 9, 1932.   J. L. DRAKE   1,870,242
GLASS FURNACE
Filed Jan. 12, 1928
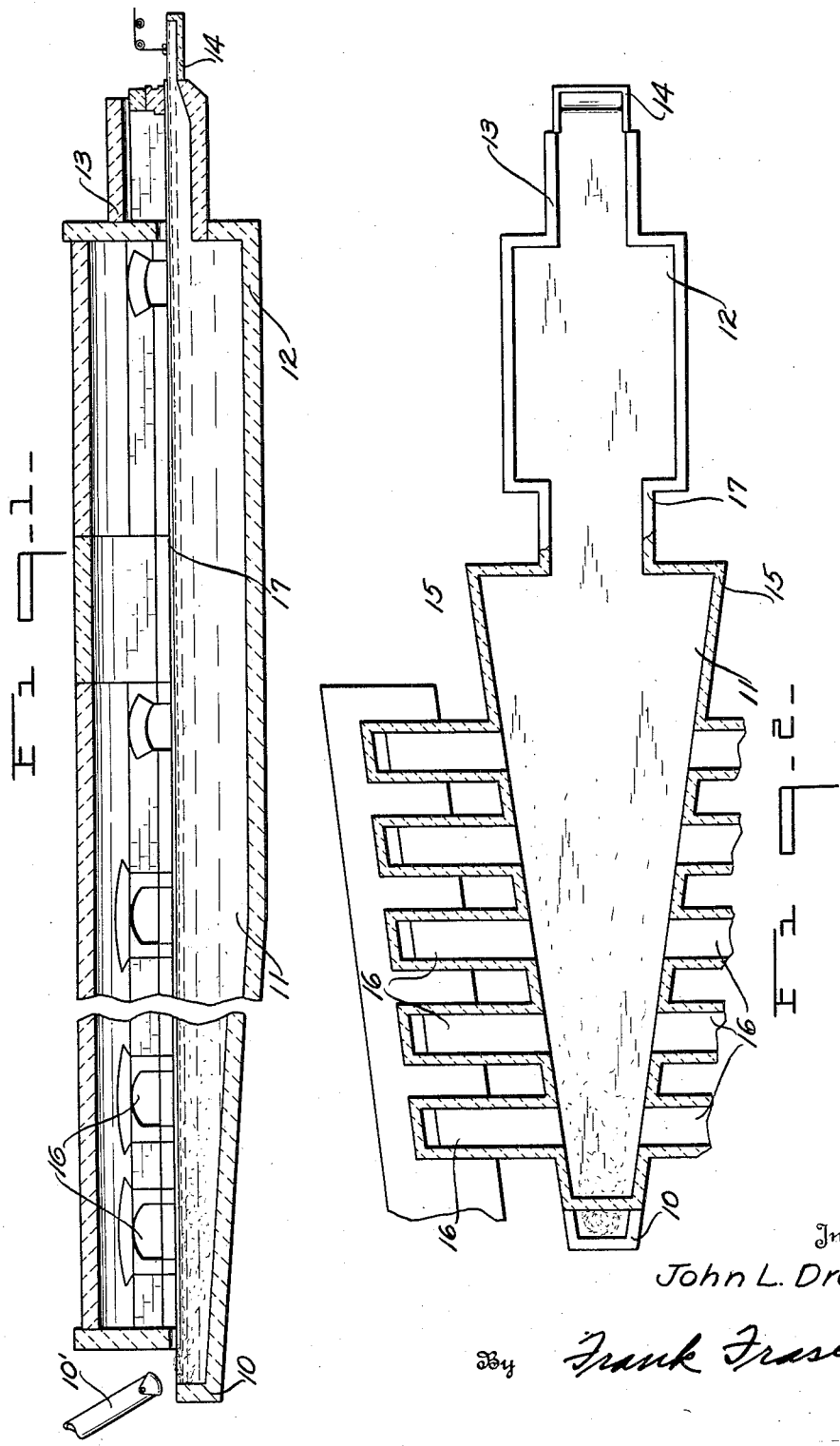
Inventor
John L. Drake
By Frank Fraser
Attorney Patented Aug. 9, 1932

1,870,242

UNITED STATES PATENT OFFICE

JOHN L. DRAKE, OF TOLEDO, OHIO, ASSIGNOR TO LIBBEY-OWENS-FORD GLASS COMPANY, OF TOLEDO, OHIO, A CORPORATION OF OHIO

GLASS FURNACE

Application filed January 12, 1928. Serial No. 246,140.

This invention relates to glass furnaces and more particularly to a novel construction thereof tending to simplify, render more efficient and improve the same generally.

One of the objects of this invention is to provide a glass furnace having certain of its walls thereof arranged in diverging relation to provide a tank of increasing size and more particularly to arrange the longitudinal side walls of the melting tank in diverging relation to provide a chamber which tapers from a width of the dog house or intake end of the furnace to a width considerably greater at the end remote therefrom. With such a construction it is possible to practically eliminate the formation and accumulation of dog metal at the end of the melting tank adjacent the dog house.

Another object of this invention is to provide a melting tank relatively narrow at the dog house or intake end thereof and progressively increasing in width toward the end remote from the dog house together with regenerators or other heating devices opening into the diverging side walls of the tank whereby the heating devices will be positioned closer together adjacent the dog house end at the point where the glass batch is introduced than at the outlet end with the distance between opposed heating devices increasing as the width of the melting tank increases. Another advantage of such a construction is that the glass batch may be more readily melted and reduced to molten glass.

Still another object of the invention is to provide a glass tank furnace having a downwardly inclined bottom in the melting end thereof, whereby the depth of the glass increases from the melting end of the furnace toward the working end thereof. Also the heating means are also preferably controlled in a manner that the most intense heating takes place at the intake end of the furnace while the temperature is gradually decreased from there toward the working end.

Many other objects, advantages and novel details of construction of this invention will be made more apparent as this description proceeds, especially when considered in connection with the accompanying drawing, wherein:

Figure 1 is a longitudinal sectional view of a glass furnace constructed in accordance with this invention, and Figure 2 is a view partly in longitudinal section and partly in elevation of the structure illustrated in Figure 1.

Referring now more particularly to the drawing wherein like reference characters indicate like parts it will be noted that there is illustrated a furnace which includes a dog house or intake end 10, a melting tank 11, a refining chamber 12, a cooling chamber 13 and a draw pot 14. As is customary in glass furnaces of the general character to which this invention pertains the glass batch ingredients are introduced such as by the means 10' into the furnace through the dog house 10 and flows through the melting tank 11 and thence successively through the refining chamber and cooling chamber into the draw pot or other working receptacle where the glass sheet or other article is produced in any desired or preferred manner.

In accordance with the present invention the longitudinal side walls 15 of the melting tank are arranged in diverging relation commencing at points spaced substantially coincident with the width of the adjacent end of the dog house and diverging to a width considerably greater at the end remote from the dog house. Thus a chamber of progressively increasing size or of tapering width is provided.

As is clearly shown in Figure 1 the bottom of the melting end 11 is inclined downwardly from the dog house so that the depth of the stream of molten glass becomes greater as well as its width. It will therefore be apparent that due to the relatively small mass at the intake end the batch ingredients can readily and thoroughly be reduced to molten glass. This will eliminate to a minimum the possibility of unmelted batch entering into the finished commercial product.

Associated with the melting tank and preferably with the diverging side walls thereof are a plurality of regenerators or other heating devices 16. By reason of the fact that these heating devices open into the diverging side walls of the melting tank, those heating devices located adjacent the dog house end of the tank are in closer proximity to one another and to the contents of the tank than those located nearer the end remote from the dog house; also the regenerators are preferably controlled in a manner that those nearest the dog house give the greatest heat while the others give progressively less heat.

In accordance with the present construction the glass batch introduced into the melting tank through the dog house fills the space between the side walls of the tank and as this batch melts and flows longitudinally of the tank it spreads and continues to fill the space between these side walls.

With such a construction the introduction of additional glass batch causes a longitudinal flowing movement of all of the contents of the tank between the two diverging side walls in contra-distinction to heretofore known types of furnaces. In furnaces of the type now generally employed the melting tank is substantially rectangular thus providing corners adjacent the dog house located laterally out of the path of movement of the material introduced through the dog house. In consequence of this the molten glass which flows into these corners becomes inactive and stagnant and devitrified and forms what is known in the art as dog metal. With the herein described construction these disadvantages are eliminated.

Also as a result of the herein described construction the glass batch may be more readily and efficiently melted by reason of the fact that those heating devices which act upon the glass bath immediately after its introduction into the melting tank are arranged closer together and in closer proximity to the contents of the tank than those located at points spaced further along the length of the tank.

In Figure 2 the furnace is illustrated as having a neck 17 connecting the melting end 11 and the refining chamber 12. However, the use of this neck is not necessary to the successful operation of this invention as the exit end of the melting end can coincide with the width of the refining chamber. It will of course be understood that the glass begins to become refined in that portion of the furnace designated by the numeral 11. Of course the chamber 12 is the main refining zone of the furnace.

While the embodiment of the invention has been described herein somewhat in detail it will be readily apparent to those skilled in this art that various changes, modifications and rearrangements of parts may be resorted to without departing from the spirit and scope of this invention and to this end reservation is made to make such changes as may come within the purview of the accompanying claims.

I claim:

1. In glass apparatus, a furnace including a melting end having an inclined bottom and side walls diverging from the intake end of said furnace.

2. In glass apparatus, a furnace including a melting tank having a downwardly inclined bottom and side walls diverging from the intake end to the outlet end thereof.

3. In glass apparatus, a furnace including a melting tank increasing laterally in cross section from the intake end to the outlet end thereof, and a plurality of regenerators located at opposite sides of the tank, the opposed regenerators being closer together at the intake end of the tank and gradually becoming further apart towards the outlet end thereof.

4. In glass apparatus, a furnace including a melting tank increasing both laterally and vertically in cross section from the intake end to the outlet end thereof.

5. In glass apparatus, a furnace including a melting tank increasing both laterally and vertically in cross section from the intake end to the outlet end thereof, and a plurality of regenerators located at opposite sides of the tank, the opposed regenerators being closer together at the intake end of the tank and gradually becoming further apart towards the outlet end thereof.

6. In glass apparatus, a furnace including a melting tank having the side walls thereof diverging from the intake end to the outlet end thereof, and a plurality of regenerators associated with the opposite diverging side walls, the opposed regenerators being closer together at the intake end of the tank and gradually becoming further apart towards the outlet end thereof.

7. In glass apparatus, a furnace including a melting tank having side walls diverging from the intake end to the outlet end thereof and having an inclined bottom slanting downwardly from said intake end toward said outlet end.

8. In glass apparatus, a furnace including a melting tank having side walls diverging from the intake end to the outlet end thereof and having an inclined bottom slanting downwardly from said intake end toward said outlet end, and a plurality of regenerators associated with the diverging side walls of the tank, the opposed regenerators being closer together at the intake end of the tank and progressively becoming further apart toward the outlet end thereof.

Signed at Toledo, in the county of Lucas and State of Ohio, this 9th day of January, 1928.

JOHN L. DRAKE.